Figure 1:
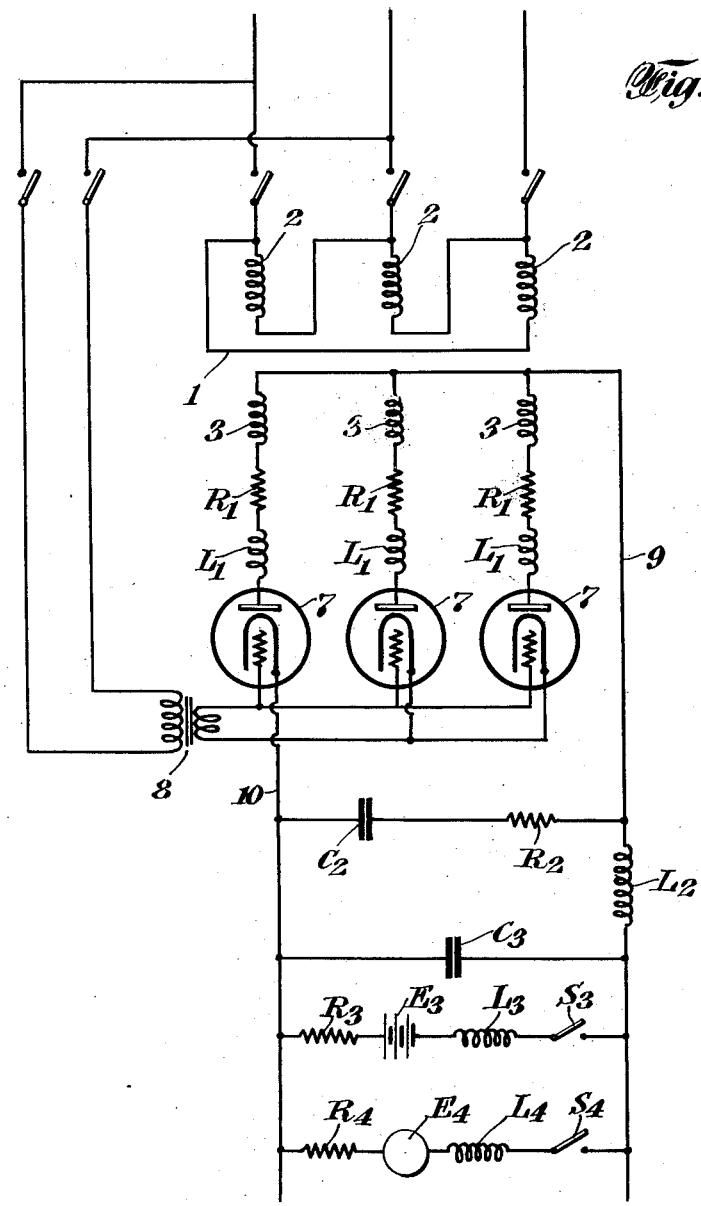

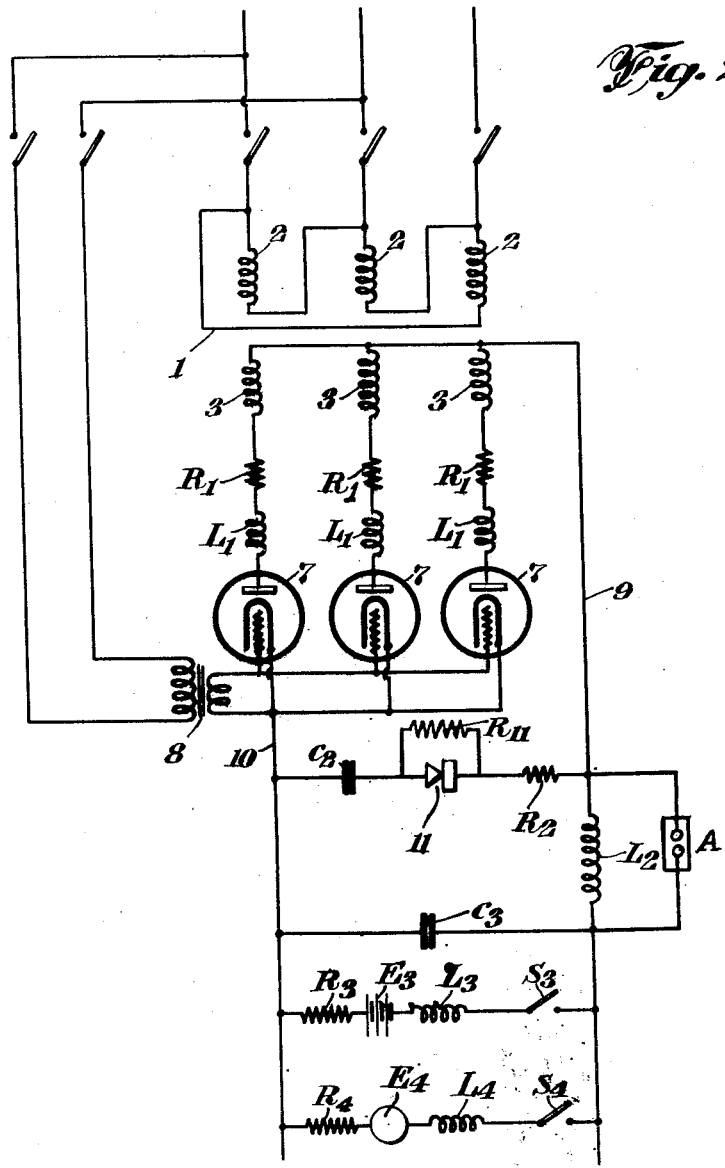

Patented May 12, 1942

2,282,998

UNITED STATES PATENT OFFICE 2,282,998

RECTIFIER CIRCUIT

Donald V. Edwards, Montclair, N. J., assignor to Electrons, Inc., a corporation of Delaware Application July 1, 1940, Serial No. 343,441

4 Claims. (Cl. 175—363)

This invention relates to electrical rectifier circuits for the conversion of alternating current into direct current. It is particularly applicable to power rectifiers for substantial currents having smoothing inductance in series with the direct current load.

The object of the invention is to provide a circuit which will minimize the inverse voltage surges applied to the rectifying elements, particularly the severe ones incident to switching operations in the direct current circuit.

Heretofore, an occasional failure commonly known as an arc-back, has been unpredictable. Its occurrence has been accepted as a purely random phenomenon. It, of course, occurs when the rectifying element is defective. It has also been observed on rectifying elements which are not defective and are capable of withstanding more than ten times the peak inverse voltage normally applied each cycle of the alternating current supply frequency.

In the accompanying drawings

Fig. 1 shows diagrammatically a three phase rectifier and associated load embodying my invention; and Fig. 2 shows a modification for controlling the loss of power occasioned by ripple voltage.

Referring to Fig. 1 of the drawings, a three-phase, alternating current power supply is connected to transformer 1 having delta-connected primary windings 2, 2, 2, and star-connected secondary windings 3, 3, 3. The internal resistance of the transformer and its leakage reactance are indicated symbolically as lumped resistances $R_1$, $R_1$, $R_1$, and inductances $L_1$, $L_1$, $L_1$, respectively. The outside ends of the secondary windings 3 are connected to rectifying elements 7, 7, 7. In the figure, these are shown as hot-cathode, gas-filled rectifier tubes, though the invention applies equally well if mercury pool, dry disc, or any other rectifying element is used. Cathode heating energy is supplied to the tubes by means of transformer 8. This constitutes a conventional rectifier circuit where the center-tap lead 9 of the secondary winding is the negative direct current lead, and the common cathode connection 10 is the positive lead of the direct current. The usual smoothing inductance to suppress the circulation of harmonic current in the direct current load circuit is shown at $L_2$.

$C_2$ is a capacitance and $R_2$ is a resistor, the capacitance being larger than the capacitance of $C_3$. A representative load consisting of electric motors may be indicated for purposes of analysis by the back electromotive forces $E_3$, $E_4$, inductances $L_3$, $L_4$, and internal resistances $R_3$, $R_4$. The stray capacitance of the direct current circuit and the filter capacitance, if used, is indicated at $C_3$.

A discussion of events in the circuit when load is abruptly decreased or removed will make clear the operation. To do this, it is necessary to consider the rectifier together with its load which is shown diagrammatically in the drawing.

Under steady load conditions with switch $S_3$ closed and current I flowing through the motor, $C_2$ and $C_3$ will be charged to the direct current line voltage E, inductances $L_1$, $L_2$ and $L_3$ will have stored magnetic energy equal to $$\frac{I^2 L_1}{2}, \frac{I^2 L_2}{2}, \text{ and } \frac{I^2 L_3}{2}$$

watt seconds respectively. A transient occurs on removal of load due to redistribution of this energy. It may be produced by opening switch $S_3$.

When the contacts of switch $S_3$ are separated, the various inductances will generate whatever voltage is necessary to continue the flow of current through them until their stored energy is spent. Current thus continues to flow until the energy stored in $L_2$ is dissipated in the arc at the switch and in $R_3$. After this, the circuit may or may not be opened by the switch, depending on the quality of the switch and on the rate of circuit voltage recovery. If $C_3$ is small and the current large, it is apparent that any tendency of the arc at the switch to go out will shunt charging current into $C_3$, causing the voltage across it and across the arc at the switch to rise rapidly, strengthening or reigniting the arc at the switch. In this case the arc at the switch persists until most of the stored energy in $L_2$ is dissipated before the switch succeeds in interrupting the current. When it does interrupt, $C_3$ will have a stored surge charge corresponding to the maximum voltage across switch $S_3$ just before current interruption.

If on the other hand $C_3$ is large for the current flowing, the rate of circuit voltage recovery is slow. Any tendency of the arc at the switch to go out shunts current into $C_3$. Being large, $C_3$ limits the rate of increase of voltage. If the condenser and arc voltage rise slowly enough for the switch to de-ionize before a material increase in arc voltage occurs, the switch will interrupt the circuit and maintain it interrupted. In this event practically all of the stored energy in $L_2$ will flow into condenser $C_3$, charging it to an enormous voltage. The value of the surge voltage $E_3$ to which capacitance $C_3$ charges before the current I in $L_2$ is brought to zero equals the square root of $$\frac{I^2 L_2}{C_3}$$

This condition often occurs in practice, as $C_3$ amounts to several microfarads if much insulated cable is used in the direct current wiring.

During the decay of current through $L_2$ a voltage appears across $L_1$ which adds to the applied inverse voltage of all the rectifying elements not conducting at the moment. However, as $L_1$ is usually small compared to $L_2$, this is usually an immaterial surge. It may be decreased if desired by increasing $L_2$.

While current is decaying and $C_3$ charging to abnormal voltage, no excess inverse voltage is applied to the rectifying elements other than the small amount from $L_1$. However, as soon as current through the rectifier is brought to zero the voltage across $L_2$ would drop to zero and permit the full voltage charge on $C_3$ to add to the inverse voltage across the rectifying elements were it not for $C_2$.

By the addition of $C_2$, surge inverse potential cannot appear across the rectifier elements until current flows from $C_3$ back through $L_2$ to $C_2$. By making the capacitance of $C_2$ large compared to $C_3$ the rise in voltage of $C_2$ when all of the surge energy in $C_3$ has been transferred to it can be held to a reasonably small value compared to the peak inverse voltage applied to the rectifying elements.

Damping of the circuits including $C_2$ is accomplished by $R_2$ which, with $R_1$ preferably, is more than one-fifth the critical resistance for the circuits $L_1$, $R_1$, $R_2$, $C_2$ and $7$; that is, $R_1$ plus $R_2$ should exceed roughly ⅕ of the square root of $$\frac{4L_1}{C_2}$$

If $R_2$ is made too low, the overshoot in voltage on $C_2$ when the rectifier is turned on will apply excessive surge inverse voltage. However, $R_2$ should not be large compared to the impedance of $L_2$ at either of two frequencies. First, the natural frequency of the circuits $C_3$, $L_2$, $C_2$ and $R_2$, since during the discharge of $C_3$ after a decrease in load surge voltage across $C_2$ and $R_2$ in series, adds to the applied inverse voltage and must be held to a minimum. Second, the natural frequency of the load alone. If, for instance, two motors are running, that is, switches $S_3$ and $S_4$ are closed and one motor is shut off by opening $S_3$, the circuit $C_3$, $L_4$, $R_4$ may oscillate at its natural frequency. Since $L_2$, $R_2$, $C_2$ are connected across this voltage oscillation, the impedance of $C_2$, $R_2$ must be held small relative to $L_2$ at this frequency.

For a given rectifier, other conditions usually fix the values of all of the above elements except $C_2$ and its dependent $R_2$. It is apparent that any value of $C_2$ larger than $C_3$ results in a decrease in the surge applied to the rectifying elements. It is also apparent that an infinite capacitance would be required to completely suppress surges. A preferable value of $C_2$ is such that the surge inverse voltage is reduced to less than the inverse voltage rating of the rectifying elements.

The surge protection described above is relatively ineffective against surges coming from the alternating current line. Fortunately the transformer absorbs most of these and seldom allows surges more than 50% in excess of normal to reach the rectifying elements, thus permitting the use of rectifying elements having a voltage limit of only 50% in excess of normal conditions.

The above considerations have been described for a three-phase rectifier. However, they apply equally well to a rectifier of any number of phases except a half-wave rectifier. They also apply to bridge and series rectifier circuits. The invention may be applied to rectifiers with interphase transformers. The total value of $C_2$ is calculated, including the series inductance with the leakage inductance of the interphase transformer. This total capacitance is then divided up equally among the branches of the interphase transformer. For instance, the usual 6-phase circuit with center-tapped interphase transformer requires two capacitances, each half of the calculated total, each connected from cathode through its damping resistor to an outside end of the interphase transformer winding.

In normal operation the ripple voltage of the rectifier output is applied to $C_2$, $R_2$, and occasions a continuous loss of power in $R_2$. Where the loss due to ripple current is appreciable the circuit shown in Fig. 2 may be employed. In this circuit a small rectifying element 11, shunted by a high resistance $R_{11}$, may be connected in series with the resistor $R_2$ allowing condenser $C_2$ to be charged freely by normal load current from the plate circuit of the tube or by surge currents from the inductance $L_2$. In some cases parallel damping resistance may be substituted for the series resistor $R_2$ or the rectifier 11 and resistance $R_{11}$. Such an alternate arrangement is shown in Fig. 2 where a lightning arrestor A is in parallel with the inductance $L_2$.

The need for surge protection only occurs where the normally stored energy in the inductance is large compared to that stored in capacitance following it, that is, where the main filtering or smoothing is accomplished by inductance and the filtering effect of the capacitance is insignificant. This is the condition in rectifiers for substantial (100 amperes or more) currents. Small power rectifiers, where only one or two watt seconds of stored energy exist, usually are self-protecting, as commercial rectifying elements can absorb a few watt seconds of energy by reverse current before initiating a true arc-back.

I claim:

1. A rectifier circuit comprising a source of alternating current connected through two or more rectifying elements to a direct current circuit having series inductance followed by parallel capacitance and switch-connected current-consuming load, the inductively stored energy thereof being large compared to the capacitively stored energy under normal operating conditions, additional capacitance connected across the direct current circuit on the side of the inductor opposite to the side having the capacitor and a resistor in series with the last named capacitance for attenuating energy oscillations between said source of alternating current and the additional capacitance and also for attenuating energy oscillations between said series inductance and said additional capacitance, said additional capacitance being larger in value than the parallel capacitance of said direct current circuit.

2. A rectifier circuit comprising a source of alternating current connected through two or more rectifying elements to a direct current circuit having series inductance followed by parallel capacitance and switch-connected current-consuming load, the inductivity stored energy thereof being large compared to the capacitively stored energy under normal operating conditions, additional capacitance connected across the direct current circuit on the side of the inductor opposite to the side having the first capacitor and asymmetric damping means in series with the last named capacitance for attenuating energy oscillations between said source of alternating current and the additional capacitance and also for attenuating energy oscillations between said series inductance and said additional capacitance, said additional capacitance being larger in value than the parallel capacitance of said direct current circuit.

3. A rectifier circuit comprising a source of alternating current connected through two or more rectifying elements to a direct current circuit having series inductance followed by parallel capacitance and switch-connected current-consuming load, the inductively stored energy thereof being large compared to the capacitively stored energy under normal operating conditions, additional capacitance connected across the direct current circuit on the side of the inductor opposite to the side having the first capacitor, a resistor in series with the last named capacitance for attenuating energy oscillations between said source of alterating current and the additional capacitance and also for attenuating energy oscillations between said series inductance and said additional capacitance, said additional capacitance being larger in value than the parallel capacitance of said direct current circuit and a lightning arrestor in shunt with the series inductance.

4. A rectifier circuit comprising a source of alternating current connected through two or more rectifying elements to a direct current circuit having series inductance followed by parallel capacitance and switch-connected current-consuming load, the inductively stored energy thereof being large compared to the capacitively stored energy under normal operating conditions, additional capacitance connected across the direct current circuit on the side of the inductor opposite to the side having the first capacitor, damping means in series with the last named capacitance for attenuating energy oscillations between said source of alternating current and the additional capacitance and also for attenuating energy oscillations between said series inductance and said additional capacitance, said additional capacitance being larger in value than the parallel capacitance of said direct current circuit, and a rectifier shunted by an inductance in series with the additional capacitance.

DONALD V. EDWARDS.